United States Patent Office 3,168,217
Patented Feb. 2, 1965

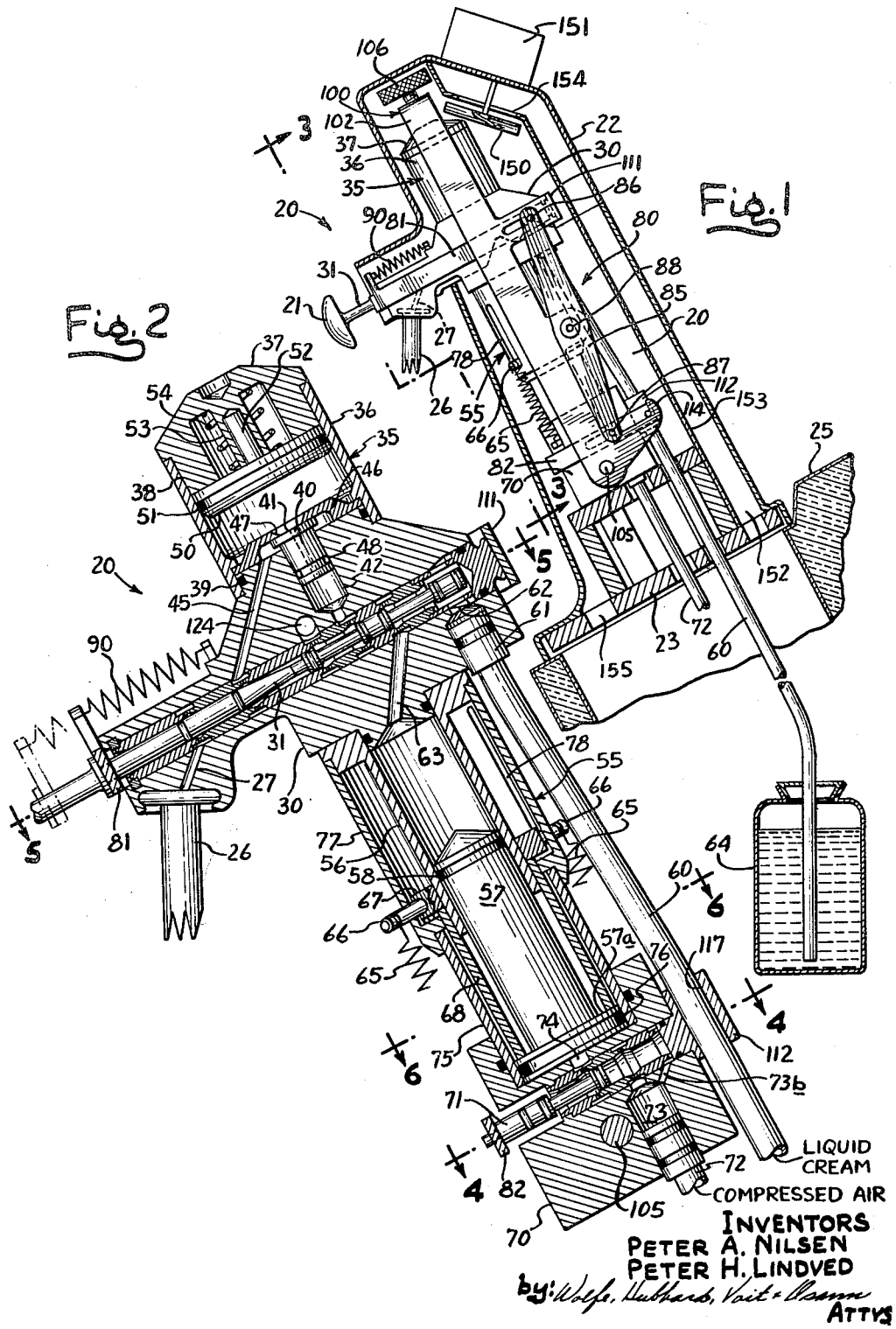

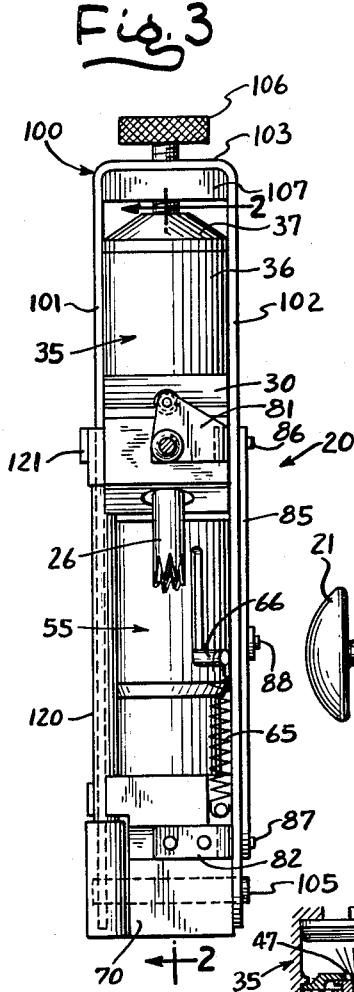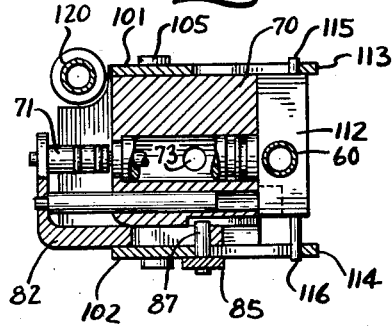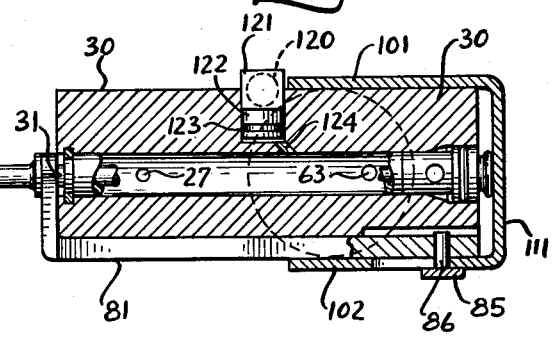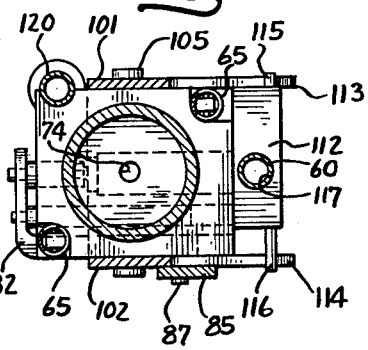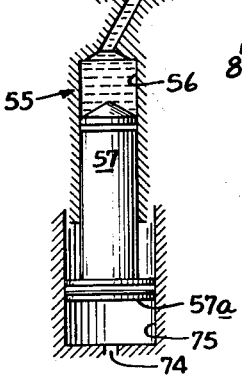

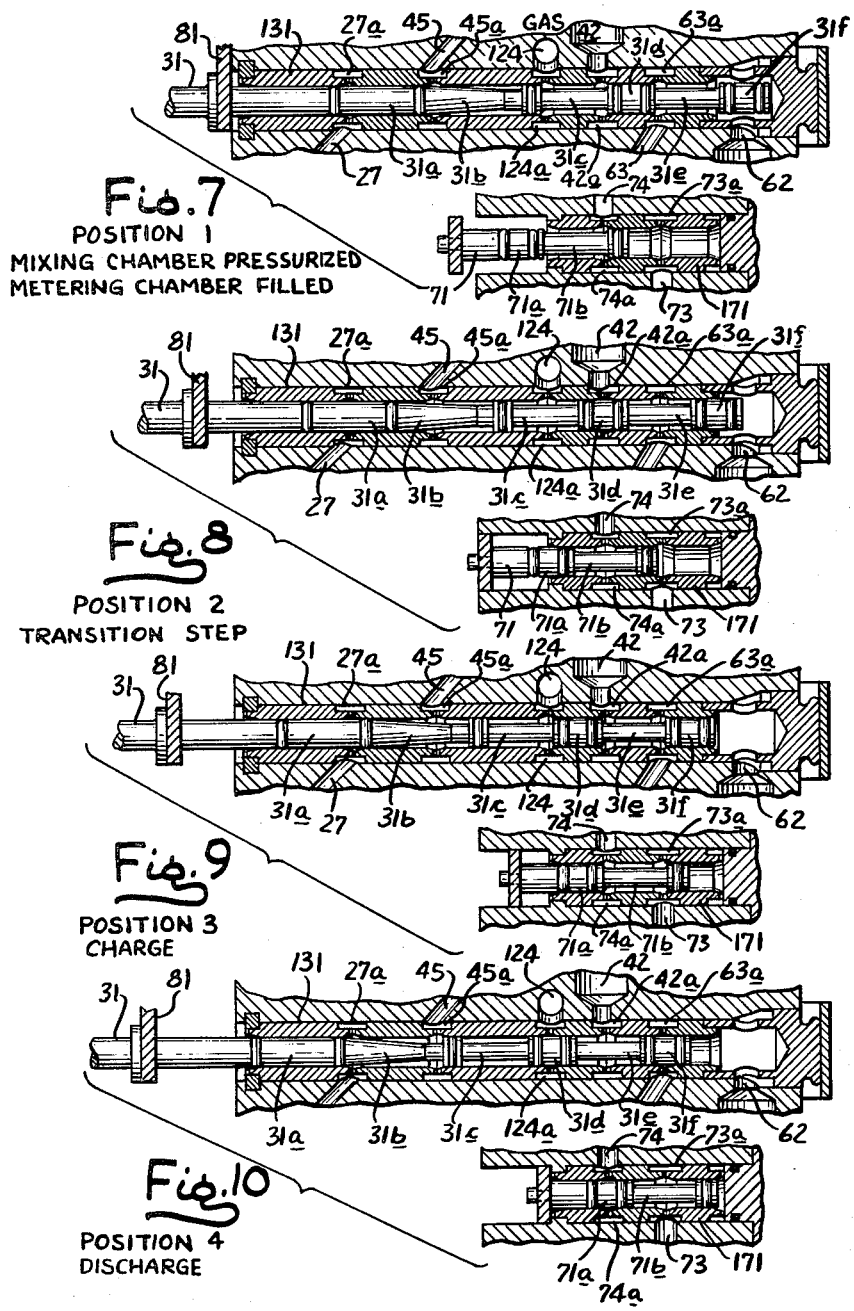

3,168,217
CREAM WHIPPING AND DISPENSING DEVICE
FOR FOUNTAINS
Peter Alfred Nilsen, Villa Park, and Peter Henrik Lindved, Lombard, Ill., assignors, by mesne assignments, to Nilsen Mfg. Co., Haines City, Fla., a corporation of Florida
Filed Sept. 12, 1961, Ser. No. 137,641
4 Claims. (Cl. 222—4)

The present invention relates to cream whipping and dispensing devices and more particularly to improved means for whipping and dispensing cream in individual-sized servings.

It is an object of the present invention to provide a cream whipping and dispensing device which is capable of utilizing bulk cream in liquid form without necessity for keeping the cream sealed in a pressurized reservoir.

It is another object to provide a cream whipper and dispenser which is easy to operate and service and which does not require the user to connect pressure lines or to release pressure lines when the reservoir is exhausted and incident to replenishing it. Consequently it is an object to provide a whipped cream dispenser which is perfectly safe to use even in the hands of untrained or careless personnel. It is another and related object to provide a whipped cream dispenser having a reservoir at atmospheric pressure which permits liquid cream to be added from time to time as may be necessary to keep the cream up to a desired, or minimum, level and which permits easy observation of the amount of cream remaining. It is therefore an object to provide a whipped cream dispensing device which is completely reliable and which minimizes the possibility of running out of cream during periods of heavy demand, making the device well suited for use in fountains, restaurants or the like where the usage of whipped cream may vary over wide limits from day to day and from hour to hour during the day. It is a related object of the invention to provide a cream whipping and dispensing device in which cream is taken from a non-pressurized reservoir serving by serving so that any unused cream may be diverted to other purposes and avoiding the possibility of waste. Thus the present device is to be contrasted with prior devices in which a body of liquid cream, once pressurized, is connected for use in the device, with the possibility of spoilage during the periods of low demand.

Another object of the invention is to provide a whipped cream dispenser capable of producing whipped cream of consistent high quality, with the desired maximum "overrun," and which is not at all critical as to the butter fat content of the bulk cream which is used. It is another object to provide a whipped cream dispenser in which the quality of whipped cream is the same from the beginning to the end of the discharge without the "dribbling" or "spitting" which occurs at the end of the cycle in some prior dispensers and which tends to spoil the appearance of the whipped cream when used as a decorative topping.

It is another object to provide a cream whipping and dispensing device which is easy to operate, requiring but a light pull on a discharge plunger, with all of the functions such as the filling of the metering chamber, the pressurizing of the mixing chamber, the injection of cream into the mixing chamber and the final discharge occurring automatically and in timed sequence without exercise of any care or judgment on the part of the operator. It is a related object to provide a cream whipping and dispensing device in which metering occurs accurately and automatically and in which the amount of whipped cream discharged in each cycle is therefore exactly predetermined and outside of the control of the operator.

It is still another object of the present invention to provide a cream whipping dispensing device which, although it carries out a number of different functions in exact sequence it is, nevertheless, simple of construction and easily disassembled for cleaning. Consequently it is an object to provide a cream whipping and dispensing device for fountains and restaurant use which meets the health requirements of the various states and municipalities. It is a related object to provide a whipped cream dispenser having a novel valve construction in which a valve insert and valve plunger may both be readily removed and separated from one another for "straight through" cleaning by a brush or the like.

It is, moreover, an object of the invention to provide a device of the above type which is exceedingly compact and which may be mounted in a conventional syrup rail, with the only connection being a connection to a non-pressurized reservoir of liquid cream and source of gas.

Other objects of the invention will become apparent upon reading the attached detailed description and upon reference to the drawings in which:

FIGURE 1 is a vertical elevation of a cream whipping and dispensing device constructed in accordance with the present invention with the "near" portion of the housing removed.

FIG. 2 is a vertical section taken along the line 2—2 in FIG. 3.

FIG. 3 is a front view of the device looking along the line 3—3 in FIG. 2.

FIG. 4 is a transverse section through the lower valve assembly and taken along the line 4—4 in FIG. 2.

FIG. 5 is a transverse section taken through the upper valve assembly and loking along the line 5—5 in FIG. 2.

FIG. 6 is a transverse section taken through the metering piston along the line 6—6 in FIG. 2.

FIG. 7 is a diagram showing the upper and lower valves in their initial condition, referred to as "Position 1," prior to the pulling of the plunger.

FIG. 8 is a diagram showing the valves in "Position 2" which is a transition step.

FIG. 9 is a diagram showing the valves in "Position 3" at which time the liquid cream is injected into the pressurizing chamber.

FIG. 9a is a simplified diagram corresponding to "Position 3" and showing the liquid cream being injected into the mixing chamber.

FIG. 10 is a diagram showing the valves in "Position 4" with the plungers in their limit positions for discharge of whipped cream.

While the invention has been shown and described in connection with a preferred embodiment, it will be understood that it is not intended to limit the invention to the illustrated form but, on the contrary, it is intended to cover the various equivalent and alternative constructions falling within the spirit and scope of the appended claims.

Turning to the drawings, and particularly to FIGS. 1–3 there is shown a cream whipping and dispensing mechanism 20 having an operating plunger or handle 21 and contained within an insulated housing 22. The mechanism is mounted on a base 23 which is designed to fit on a standard, refrigerated syrup rail 25 of the type used in fountains and restaurants. Projecting downwardly from the whipping and dispensing mechanism is a discharge nozzle 26 fed by a passage 27.

Mounted centrally in the device is a first valve body 30 having a valve plunger 31 preferably of the spool type slidable therein and connected at its outer end to the manually operated handle 21. Superimposed on the valve body 30 is a mixing chamber 35 which, as will be described in greater detail, is charged with aerating gas and liquid cream. The operation of the device is such that when the handle 21 is pulled outwardly liquid cream is first admitted under pressure to the mixing chamber 35 where it is mixed with the gas. Completing the outward movement of the handle causes the cream to be discharged from the nozzle 26 in whipped form.

For convenience the mixing chamber 35 is formed of several pieces including a cylindrical shell 36 and an enclosing cap 37, with telescopic joints 38, 39, the joint 39 including an O-ring to prevent escape of the gas.

For the purpose of admitting gas and liquid cream into the mixing chamber 35, it is provided with an inlet nozzle 40 having a small orifice 41, the nozzle being received in a vertical bore 42 formed in the valve body. To discharge the aerated cream at the end of the mixing cycle a discharge port 45 is provided in the valve body, the port being connected to the discharge nozzle 26 via the valve plunger 31.

It is one of the features of the present construction that, while the mixing chamber 35 has separate inlet and outlet orifices, means are provided for shutting off the outlet orifice right at the mixing chamber automatically upon admission of unaerated liquid cream. To accomplish this the nozzle 40 is not stationary but is, on the contrary, movable within the bore 42 into and out of engagement with a disc shaped barrier member 46 which is seated on the bottom end of the mixing chamber and which has a central opening 47. The nozzle is sealed with respect to the bore 42 by an O-ring 48 or the like. With the above structure in mind it will be apparent that when liquid cream is admitted into the bore 42 and forced through the orifice 41, back pressure is effective to force the nozzle 40 upwardly into seated position on the barrier member 46, and this seating persists until all of the cream, constituting a charge, is intimately mixed with the aerated gas in the mixing chamber. This insures that none of the non-aerated cream will find its way into the discharge passage 45, that is, cream which could remain liquid on discharge and thus contaminate the whipped cream. By insuring that only aerated cream is discharged it is possible, in the present construction, to maintain the same whipped consistency from the beginning to the end of the discharge cycle.

Prior to proceeding to the means used to charge the mixing chamber 35 with cream, mention may be made of one of the improved features of the mixing chamber. Thus in accordance with the present invention there is provided within the mixing chamber 35 a spring pressed diaphragm 50 which is slidable therein and movable between a compressed position in which the effective volume of the mixing chamber is maximum and a released condition in which the effective volume of the mixing chamber is substantially zero. The diaphragm in the present instance is in the form of a piston which is sealed with respect to the cylinder 36 by an O-ring 51. To guide the piston 50 for centered movement within the cylinder 36, the piston includes a central pin 52 which is telescoped in a sleeve 53 integrally formed in the cap 37. In order to urge the piston downwardly to the "zero volume" condition, a coil spring 54 surrounds the sleeve and exerts pressure upon the diaphragm. The spring is preferably pre-stressed so that it exerts pressure when the diaphragm is all the way down. The maximum spring pressure is however sufficiently low as to be readily overcome by the pressure of the aerating gas. It is found that this arrangement provides for more positive and complete discharge of a portion of whipped cream than prior devices. Since the piston 50 follows behind the aerated cream as it flows through the discharge passage 45, the volume of the mixing chamber is reduced to zero by the time all of the area of the cream has been ejected and consequently there is no residual gas to cause spitting or blowing at the discharge nozzle 26 after the cream has been applied as a topping. Consequently the decorative appearance is preserved.

In accordance with the present invention means are provided for positively metering a certain volume of liquid cream, corresponding to an individual sized portion, from an unpressurized source or reservoir by siphoning action and for positively injecting the charge of cream into the mixing chamber at a pressure sufficiently high as to overcome the pressure of the aerated gas charged in the mixing chamber. In the present device this metering is accomplished by a metering chamber 55 formed of a cylinder 56 which is secured to the underside of the valve body 30 and within which is a vertically movable piston 57, the piston being sealed within the cylinder by an O-ring 58. Cream is fed into the metering chamber via a cream supply line 60 having a fitting 61 at its upper end which is sealed with respect to the valve body. The liquid cream flowing in through the line 60 is drawn through a passageway 62 in the valve body and which communicates with the upper end of the metering chamber. The lower end of the supply line 60 extends into an unpressurized container of liquid cream 64 which is shown diagrammatically in FIG. 1. In carrying out the present invention, a return spring is provided for retracting the metering piston 57 to its lower position thereby siphoning cream from the reservoir 64 into the metering chamber. In the present instance two coil springs 65 are used, which are anchored at their lower ends to the body 70 and which are connected at their upper ends to pins 66 which are movable with the piston. For connecting together the pins 66 and the piston, the pins are fitted into a collar 67 which in turn is conected to a sleeve 68 which bears against the lower end of the piston.

For the purpose of forcibly ejecting the liquid cream from the metering chamber at a pressure which is sufficiently high as to overcome the pressure of the aerating gas in the mixing chamber, compressed air under the control of an air valve is applied to the underside of the piston 57. For controlling the air a second valve body 70 is provided having a valve plunger 71 slidable therein. Compressed air is supplied by an air line 72 which is received in a bore or inlet 73 formed in the valve body 70. An outlet passage 74 formed in the valve body communicates with the underside of the piston 57. In order to cause the unit pressure which is applied to the cream to exceed the pressure of the compressed air, the piston 57 is so formed that the area in contact with the compressed air exceeds the area which is in contact with the cream. Thus there is provided at the lower end of the piston 57 an enlarged annular portion 57a which is slidable within an outer cylinder 75 and sealed with respect to the latter by an O-ring 76. For the purpose of securing the outer cylinder 75 to the valve body 30, the cylinder 75 is, at its upper end, telescoped into a mounting sleeve 77 in which slots 78 are formed for guiding the pins 66 which move with the pistons.

It will be apparent from the above that the metering mechanism, while employing a single movable piston 57, nevertheless defines two cylinders, a first cylinder 56 which serves as the metering chamber and a second cylinder 75 which defines the compressed air chamber below the piston.

When the air valve plunger 71 is moved into a position to supply compressed air to the passageway 74 which leads to the underside of the piston, the piston is forced upwardly causing cream to be forcibly ejected, via the passage 63 and valve 31, through the orifice 41 for spray type discharge into the mixing chamber. Simultaneously as the piston moves upwardly, the springs 65 are tensioned to store energy therein.

Thus it will be apparent that, when the air pressure is cut off by the valve 71 and the pressure under the piston is restored to atmospheric, the springs 65 acting through the sleeve 68 will force the piston downwardly creating a vacuum in the metering chamber. Such sequence will be reviewed at a later point; it will suffice for the present to note that during the refill portion of the cycle the cream line 60 is connected to the metering chamber so that cream is sucked upwardly from the reservoir completely filling the metering chamber.

In accordance with one of the aspects of the invention means are provided for operating the valve plungers of the upper and lower valve bodies in unison with one another thereby to coordinate the application of air pressure with the setting of the ports in the upper valve body. In order to understand the means for accomplishing this, reference is made to FIGS. 1, 5 and 6. Associated with the upper valve plunger 31, is an upper slide member 81 (FIG. 5) which is of L-shape and which is mounted for reciprocation back and forth on the side of the valve body 30. The slide 81 is connected to the left hand end of the plunger 31 is shown in FIG. 5. A similar slide 82, also of L-shape, is provided at the lower valve body 70 and is connected to the left hand end of the plunger 71. For coupling the two slides for movement in unison, but in opposite directions, a vertically arranged lever 85 is provided having an upper pivot 86, a lower pivot 87 and a central pivot or fulcrum 88. It will be apparent, then, that when the operating plunger 21 is pulled out, the valve plunger 31 moves to the left (FIG. 1) while the lower valve plunger 71 moves to the right for controlling the valve ports in predetermined sequence. For the purpose of restoring both of the valve plungers to the initial position, a return spring 90 is provided which is connected at its right hand end to the valve body 30 and at its left hand end to the slide 81 at the outer end of the valve plunger 31.

For the purpose of keeping all of the parts assembled together in alinement with one another and for mounting the lever 85, while, nevertheless, permitting easy disassembly for purposes of cleaning, a clamping frame or yoke 100 is provided. As shown in FIGS. 1 and 3, this clamping frame is of inverted U-shape having a left hand portion 101, a right hand portion 102 and an integral top portion 103. The lower ends of the side portions are pinned to the lower valve body 70 by a pin 105 (FIG. 1). For the purpose of applying clamping pressure, a clamping screw 106 is threaded in a nut 107 secured to the upper frame and having a tip which bears against the upper end of the mixing chamber. It will be apparent that when it is desired to disassemble the unit the clamping screw 106 is simply unscrewed, whereupon the parts may be pulled apart for cleaning. To assemeble the device the parts are telescoped together with O-rings suitably arranged between them for sealing purposes. Since mixing chamber 35, the metering chamber 55 and the two valve bodies are in axial alinement with one another, it will be apparent that the clamping forces are symmetrically distributed.

In addition to holding the assembly together axially, the clamping frame 100 is also utilized to secure certain of the parts laterally with respect to the two valve bodies. Thus, as indicated at FIG. 5, the two sides 101, 102 of the frame are bridged by a strap 111 to prevent rearward escape of the valve elements. Turning attention to the lower valve body 70, it is provided with a plug or filler block 112 which is retained in position by means of hook extensions 113, 114 which are integral with the clamping frame. The latter hook onto pins 115, 116 secured in the block. The block 112 also serves as a support for the cream line 60, with the line being passed through a bore 117 formed in the block.

For the purpose of conveying aerating gas under pressure to the upper valve body 30, a gas supply line 120 is passed upwardly along the side of the device, terminating in a right angled fitting 121 which is received in a bore 122 formed in the valve body and which is sealed with respect to the latter by an O-ring 123 (FIG. 6). The fitting 122 serves to feed a gas passage indicated at 124 (FIG. 2).

In the above discussion the construction and overall operation have been described without reference to the valve details. Attention may now be focused upon the valve plungers 31, 71 and the manner in which they co-operate to bring about the desired operating sequence. The valving sequence is set forth in a series of four stop motion views illustrated in FIGS. 7, 8, 9 and 10 respectively which correspond to the successive positions of the valve plunger as it is pulled to its outermost position. It will be understood that upon release the plunger traverses such positions in the reverse order under the urging of the biasing or return spring 90.

To understand the detailed construction of the valve plunger 31, it will be noted in the drawings that it is a compound plunger consisting of a plurality of spool elements arranged end to end and separated by suitable O-rings. For purposes of identification the successive spools have been designated by the numerals 31a–31f respectively. In order to simplify the construction of the valve body, a sleeve-like, sectioned, valve insert 131 is interposed between the valve plunger and the valve body. Communication is provided through the valve insert by forming the outer surface thereof with spaced annular grooves with access being provided from the base of the grooves to the inside surface of the insert by a plurality of radial holes. This gives a large cross section for fluid flow in accordance with a well known practice of the valve art. For purposes of identification, the annular grooves will be indicated by the number of the connected passageway plus a letter subscript. Thus, as shown in FIG. 7, the insert 131 is provided with grooves 27a, 45a, 124a, 42a and 63a.

Turning attention to the lower valve plunger 71, it will be noted that it includes two spool elements 71a, 71b, with the plunger being slidable in an insert 171 having annular grooves 74a and 73a.

At the beginning of a typical operating cycle, the valve plungers occupy "Position 1" shown in FIG. 7 (see also FIG. 2). Under such conditions the mixing chamber 35 is pressurized with aerating gas from a passage 124, the gas flowing through passage 42 via section 31c of the valve. Aerating gas may be conveniently supplied through the line 120 from a source having a regulated pressure; which may, for example, be on the order of 100 pounds p.s.i. Admission of the aerating gas to the mixing chamber causes the diaphragm 50 (FIG. 2) to move so that it occupies its uppermost position as shown. In the initial condition illustrated in FIG. 7 the metering cylinder 56 is filled with liquid cream siphoned into the metering cylinder through the supply line 60 via the valve element 31e and passage 63. It will be understood that such siphoning occurred as a result of the return action of the spring 65 at the end of the preceding cycle of operation.

Gas is prevented from escaping through the discharge nozzle 26 by the O-ring at the right hand end of valve section 31a which seals off passage 45 from the discharge passage 27 associated with the nozzle.

The lower side of the piston 57 in the metering chamber is vented to the atmosphere via passage 74 and valve element 71b. The source of compressed air fed via the passageway 73 is sealed off from the piston by the O-ring at the right hand end of the valve element 71b. Consequently the dispenser is in readiness for operation upon pulling the discharge plunger.

When the valve plunger is pulled to "Position 2" illustrated in FIG. 8, the mixing chamber is sealed off by section 31d of the valve plunger thereby isolating the mixing chamber from the source of gas. Moreover, leftward movement of the valve section 31f causes the source of liquid cream in passageway 62 to be sealed with respect to the passage 63 leading to the metering cylinder. The nozzle 26 continues to be sealed off with respect to the aerating gas in the mixing chamber. Meanwhile the lower valve plunger has moved one step to the right so that the underside of the piston 57 is sealed from the atmosphere by section 71a of the valve plunger. Consequently it will be understood that "Position 2" is simply a transition step in which the various passageways are sealed off in readiness for the following step.

As the plunger is drawn out further into "Position 3" illustrated in FIG. 9, the source of gas 124 continues to be sealed by the O-rings defining section 31c of the plunger.

The metering chamber and mixing chamber are interconnected by section 31e of the valve plunger so that liquid cream is free to move up into the mixing chamber. At the same time section 71b of the lower valve plunger is moved into a bridging position so that it interconnects the source of compressed air to the passageway 74 leading to the underside of the piston, causing the piston 57 to be forcibly propelled in the upward direction. Because of the differential area of the piston sections 57, 57a, high unit pressure is applied to the cream within the metering cylinder, a pressure which is sufficiently high so as to readily overcome any pressure of the aerating gas which is charged in the mixing chamber. The discharge nozzle 26 continues to be sealed.

For a more detailed understanding of what occurs in "Position 3" of the valve plunger, reference is made to the diagram in FIG. 9a. Here it will be noted that as the liquid cream is forced upwardly into the bore 42 below the mixing chamber it reacts against the movable nozzle member 40 so that the latter is forced into its uppermost position. In such position the nozzle seals against the barrier member 46 so that none of the liquid cream can leak into the discharge passage 45 to later contaminate the whipped cream. Because the cream is under high pressure it escapes through the orifice 41 in the form of a high velocity spray or jet causing the liquid cream to be divided into small droplets and promoting formation of foam as the jet squirts up through the gradually rising body of liquid cream in the mixing chamber. As the result of the injection under pressure and the great amount of turbulence which is produced, intimate mixture takes place between the solid cream and the aerating gas so that the gas becomes immediately and completely dissolved in the cream.

Because of the prompt mixing which occurs, the plunger may be pulled in one smooth stroke and without delay into the outermost position four as illustrated in FIG. 10. In this position the aerating gas entry passageway 124 remains sealed. Communication between the metering cylinder and the mixing chamber is cut off, with the mixing chamber being sealed by the O-rings defining section 31e of the valve plunger. The piston in the metering cylinder is sealed in its uppermost position, with the valve element 71a blocking the passageway 74 which leads to the underside of the piston. The most significant thing that occurs in this step is that passage 45 leading from the mixing chamber is connected to the discharge passage 27 leading to the nozzle via section 31b of the valve plunger. The aerated cream within the mixing chamber forces the nozzle element 40 down to its lowermost position so that aerated cream is free to escape from the discharge nozzle 26. Upon being reduced to atmospheric pressure the aerated cream expands into the well known whipped form so that a single serving of whipped cream is produced. As the liquid cream is discharged from the mixing chamber, the followup action of the diaphragm 50, under the urging of the spring 54, reduces the effective volume of the mixing chamber to zero thus precluding the existance of any residual gas and insuring that there will be no blowing or "spitting" at the tail end of the discharge.

At this point the operator simply releases the valve plunger which moves in the reverse direction under the urging of the return spring 90 through "Position 3." In this position the aerating gas continues to be sealed off by the valve element 31c. The mixing chamber and metering chamber are interconnected by the valve element 31e, but this is an idle connection since the metering piston is held stationary in its upper position. Air pressure is reapplied to the underside of the metering piston but the metering piston is in its uppermost position in any event. The discharge nozzle 26 is cut off from the mixing chamber by movement of the valve section 31b to the right, this, too, being an idle step since the mixing chamber is already fully discharged.

Further return movement brings the valve plunger back to "Position 2." The source of gas remains sealed by the valve section 31c. The mixing chamber remains sealed by the action of the valve section 31d. The discharge nozzle remains sealed. The metering chamber also remains sealed against the entry of liquid cream by section 31e of the valve. Turning attention to the lower valve plunger, compressed air is cut off by the valve section 71b with the metering piston remaining in its upper position. Consequently it is apparent that "Position 2" on the return stroke is also an idle position.

Finally the valve plunger is fully retracted into "Position 1" shown in FIG. 7. In this position the source of gas 124 is connected to the mixing chamber by section 31c of the valve plunger which causes the mixing chamber to be fully charged with gas, with the diaphragm being forced into its uppermost position (see FIG. 2). The discharge nozzle remains sealed by section 31a of the plunger so that none of the aerating gas charged into the mixing chamber can escape. Simultaneously the lower plunger moves into its left hand position in which the passage 74 leading to the underside of the piston is evacuated to the atmosphere via section 71b of the valve. Consequently the piston 57 is free to return to its lower position by the force exerted by the return springs 65. The liquid cream line is connected to the inlet passage 63 of the metering cylinder via section 31e of the valve so that, as the piston is pulled down, liquid cream is sucked through the supply line 60 from the reservoir 64. This restores the mechanism to the condition it had at the beginning of the operating cycle. The operating plunger may be immediately pulled to produce a second dicharge of a single serving of whipped cream. Because of the rapidity of fluid flow in the various parts of the device, it is not necessary to wait between servings and the plunger may be pulled as often as may be desired in quick succession.

In the preferred embodiment of the invention the section 31b of the valve plunger is preferably constructed so that when the whipped cream is released in "Position 4" such release occurs gradually rather than with explosive abruptness. For convenience the section 31b is shown tapered but such section may be cylindrical with peripheral clearance.

For the purpose of maintaining the mechanism at a low temperature, cold air may be circulated about it from the refrigerated syrup rail. Thus in the present instance a fan 150 is provided driven by a motor 151. A cold air inlet passage 152 is defined by a barrier 153 in the housing, the barrier having an aperture 154 at its upper end arranged opposite the fan. Consequently it will be apparent that cold air is drawn upward with positive displacement, bathing the device constantly in cold air with discharge back into the syrup rail through a return passage 155.

It will be apparent that the device as described is ideally suited for use in fountains and restaurants where individual, measured servings are required in quick succession and where the machine is to be operated by a number of different waitresses. Since the reservoir of liquid cream 64 is maintained at atmospheric pressure, it may be easily checked from time to time in order to determine whether the cream is at a safe level. Liquid cream may be added to the reservoir as necessary without operating any pressure valves or connections as would be required where a pressurized reservoir is used. Consequently the device may be both used and serviced without risk by inexperienced help. Operation is independent of the judgment of the user and independent of the speed at which the plunger is operated, so that a perfect product is insured at each discharge. Disassembly for cleaning purposes is easily effected simply by unscrewing the clamping screw at the top and swinging aside the clamping frame which permits the components to be slipped apart for easy cleaning.

While compressed air has been mentioned as a gas for operating the piston in the metering cylinder, it will be apparent to one skilled in the art that any other suitable gas may be used. For example, carbon dioxide may be employed or, if desired, the same source of nitrous oxide may be used as is used to charge the mixing chamber. In this connection it will be noted that the differential area at the opposite ends of the piston 57 insures that the piston will operate positively even through working against pressure from the same source.

With regard to the discharge section 31b in the upper plunger 31 it will be understood that this section has been shown as exaggeratedly conical simply to bring out that the discharge is restricted, and it will be understood by one skilled in the art that the angle of the cone may, in a practical case, approach zero, so that it is, in practical effect, a cylinder having a small clearance about its periphery with the inner wall of the valve insert.

While circulated air has been disclosed for cooling purposes it will be understood that the present invention is not limited to any particular cooling means and, if desired, cooling coils having liquid circulated therein may be provided inside of the housing. It will also be understood that the housing may, in a practical case, be of double walled construction with interposed insulation to minimize heat loss.

In the drawings the valve insert 131 and the valve insert 171 have been shown as closely fitted into a suitable bore hole in the respective valve bodies to prevent leakage. In a practical case O-rings will be provided about each of the sections which comprise the inserts and recessed in suitable grooves in the housing in order to insure that no unwanted leakage occurs from section to section.

Also in the above description it has been assumed that the valve plunger will be operated with ordinary deliberate speed in order to provide adequate time for charging of the mixing chamber and not "snapped" through "Position 3" (FIG. 9). In order to extend the effective charging time in this position the valve plunger 31 may, if desired, be modified by moving the O-ring which is at the left hand side of the section 31f of the plunger. Also the O-ring may be removed at the right hand side of the section 71a of the lower plunger 71.

In describing the operation it has been assumed that the return spring 90 exerts sufficient force to provide for positive retraction of the operating plunger when it is released. In the preferred construction an auxiliary passageway 73b is provided for applying compressed air to the right hand end of the lower valve plunger 71. Thus the compressed air augments the spring force and the spring may be made of very light construction.

We claim as our invention:

1. In a cream whipping and dispensing device the combination comprising a first ported valve body and a second ported valve body, a metering cylinder between said valve bodies having a piston movable therein, said first ported valve body having a mixing chamber as well as a source of aerating gas under pressure and a discharge nozzle, said second ported valve body being connected to a source of gas pressure and having ports for connecting the metering cylinder to the source of gas pressure for endwise movement of the piston in the metering cylinder, valve plungers in said valve bodies, said valve plungers having means for mechanically coupling them together so that they move in unison, the ports being so arranged that in successive positions of the valve plungers (a) liquid cream is drawn into said metering cylinder, (b) aerating gas is charged in said mixing chamber, (c) the liquid cream is injected under pressure from said metering cylinder into the mixing chamber for intimate mixing with the aerating gas in the latter and (d) the mixed cream and gas is discharged from the mixing chamber through said nozzle in whipped form.

2. In a cream whipping and dispensing device the combination comprising a valve body having a mixing chamber, said valve body having ports defining an inlet orifice and a discharge orifice for the mixing chamber, said valve body having ports for connection to a source of aerating gas and to a source of liquid cream under pressure, a valve plunger in said valve body cooperating with said ports for admitting aerating gas and pressurized liquid cream through said inlet orifice and for controlling discharge of aerated cream from said discharge orifice for expansion into whipped form at atmospheric pressure, said mixing chamber having means for automatically shutting off the discharge orifice upon admission of cream in liquid unaerated form through said inlet orifice so as to preclude passage of said unaerated liquid cream into said discharge orifice.

3. In a cream whipping and dispensing device the combination comprising a valve body having a mixing chamber, said valve body having ports defining an inlet nozzle and a discharge orifice for the mixing chamber, said valve body having ports for connection to a source of aerating gas and to a source of liquid cream under pressure, a valve plunger in said valve body cooperating with said ports for admitting aerating gas and pressurized liquid cream through said inlet nozzle and for controlling discharge of aerated cream from said discharge orifice for expansion into whipped form at atmospheric pressure, said inlet nozzle being movably mounted in said valve body and having valve surfaces which are closed upon movement thereof for automatically shutting off the discharge orifice upon admission of cream in liquid unaerated form through said inlet nozzle so as to preclude passage of said unaerated liquid cream into said discharge orifice.

4. In a cream whipping and dispensing device the combination comprising a first valve body, a second valve body, a metering cylinder interposed between said valve bodies, a mixing chamber, said first valve body having a source of aerating gas under pressure and having a discharge nozzle, means in said valve bodies for causing aerating gas and liquid cream from the metering cylinder to be charged into said mixing chamber for subsequent discharge in whipped form through said nozzle, said valve bodies, metering cylinder and mixing chamber being assembled in alinement with one another, and a longitudinally extending yoke for maintaining the assembly together while provision for release of the assembly for cleaning purposes.

References Cited by the Examiner

UNITED STATES PATENTS

| | | | |
|---|---|---|---|
| 2,027,171 | 1/36 | Hillis | 222—249 X |
| 2,029,460 | 2/36 | Brady | 222—146 X |
| 2,427,429 | 9/47 | Waite et al. | 222—129.3 |
| 2,693,418 | 11/54 | Smith | 141—20 X |
| 2,885,119 | 5/59 | Carriol | 222—135 X |
| 2,941,726 | 6/60 | Szczepanski | 239—329 X |

FOREIGN PATENTS 712,386  7/54  Great Britain.

RAPHAEL M. LUPO, *Primary Examiner.*

LOUIS J. DEMBO, *Examiner.*